July 20, 1926.

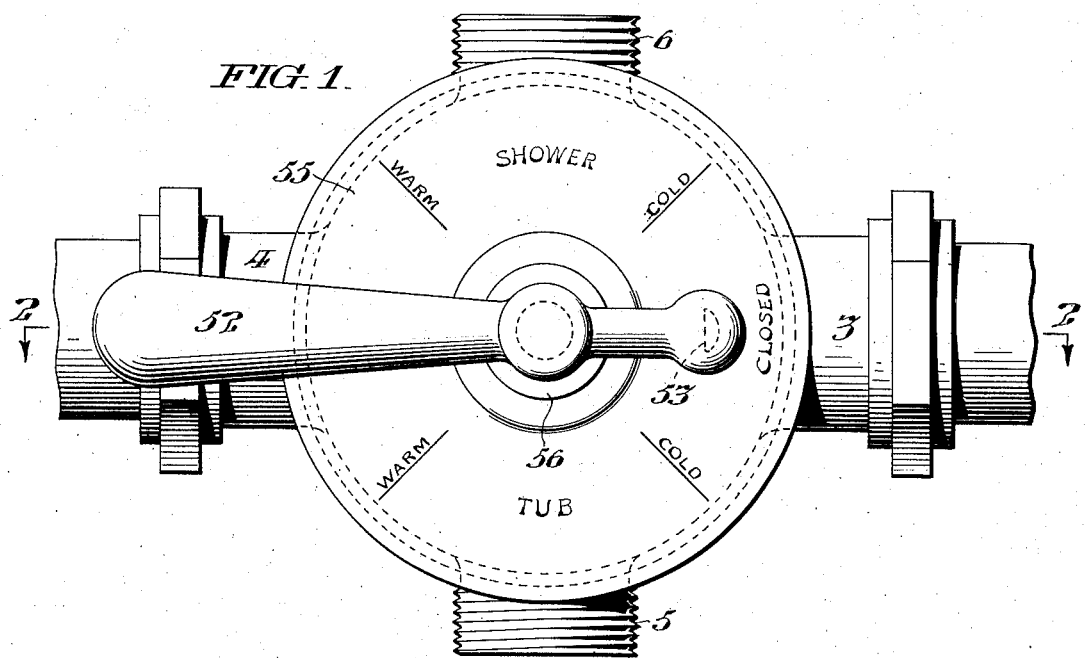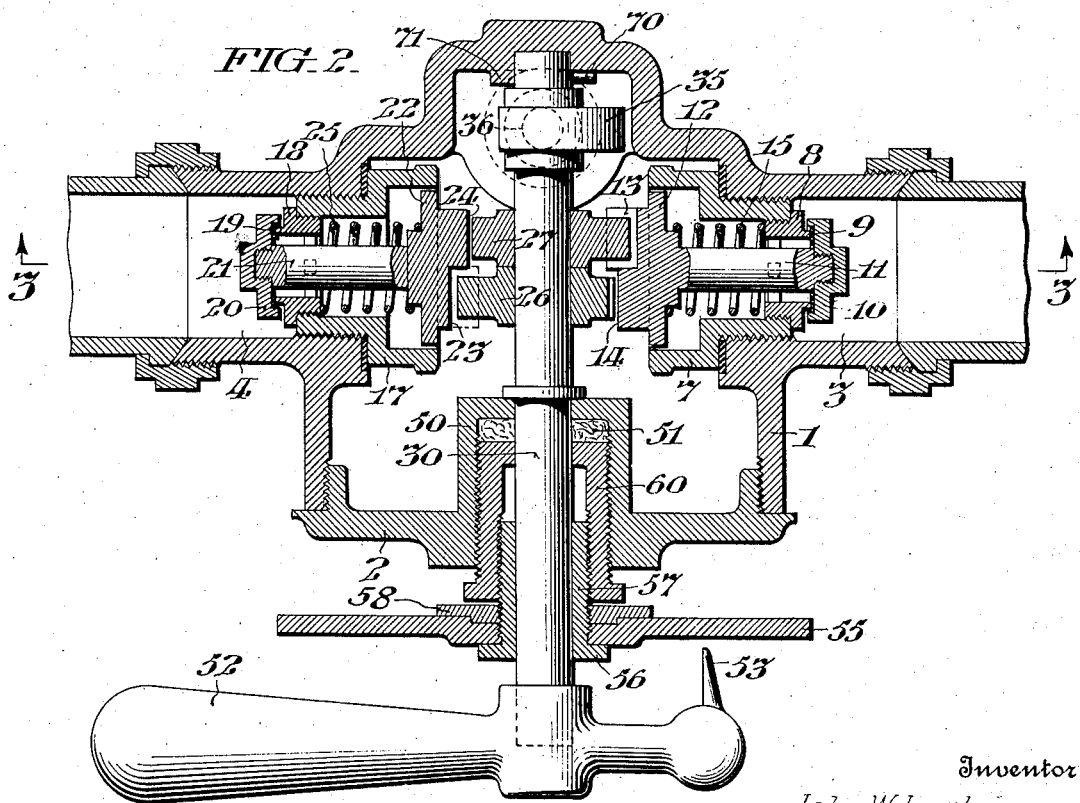

J. W. LAWLESS

VALVE

Filed July 11, 1925

Inventor
John W Lawless,

By [signature]
Attorney

Patented July 20, 1926.

1,593,127

UNITED STATES PATENT OFFICE.

JOHN W. LAWLESS, OF CAMDEN, NEW JERSEY.

VALVE.

Application filed July 11, 1925. Serial No. 42,934.

My invention relates particularly to that class of valves which constitutes the faucet commonly employed in connection with the bath or shower and designed to so control the cold and hot water inlets as to deliver a stream of water which will be of a temperature suitable for the comfortable use in the bath or shower.

The principal objects of my invention are to provide a valve which is so constructed and arranged that by the proper manipulation of a single valve stem not only the inlets for cold and hot water may be selectively controlled, but separate outlets may also be selectively controlled to deliver cold or warm water of any desired temperature to distinctly different devices, such, for instance, as a bath tub or a shower fixture.

Other objects of my invention are to provide a valve having its controlling mechanism so correlated as to avoid the accidental delivery of hot water to the fixture with which it may be connected, and to insure the admission of cold water both prior to the opening actuation of the hot water valve, and subsequent to its closing actuation, as well as during the period of admission of said hot water.

My invention comprehends such an arrangement of the valve actuating mechanism as to provide adjustments operative to vary the sequence of relative flow of the hot and cold water.

My invention further includes such an arrangement of the valve mechanism that the valve units for controlling the inlets may be readily removed and replaced or adjusted without disconnecting the valve casing from the pipe line sources of supply.

Another feature of my invention resides in the provision of means whereby the indicating dial may be adjusted axially on the valve stem with respect to the axis of the pipe connections, so as to accurately fit in flush relation to the tile or wall in which the valve is incased.

The form of my invention as hereinafter described comprises a valve casing having separate inlets for the admission of cold and hot water respectively, and a plurality of outlets leading to different fixtures adapted to receive cold water or a suitable mixture of cold and hot water, each of said inlets and outlets being provided with valve mechanism by which they may be controlled, and a valve stem common to all of said valve mechanisms arranged to be actuated to selectively control said inlets and outlets in different predetermined sequence.

My invention also includes all of the various novel features of construction and arrangement as hereinafter more definitely specified.

In the accompanying drawings:

Fig. 1 is a front elevational view of a valve structure constructed in accordance with my invention;

Fig. 2 is a plan sectional view of said valve structure taken centrally on the line 2—2 in Fig. 1;

Figure 3:
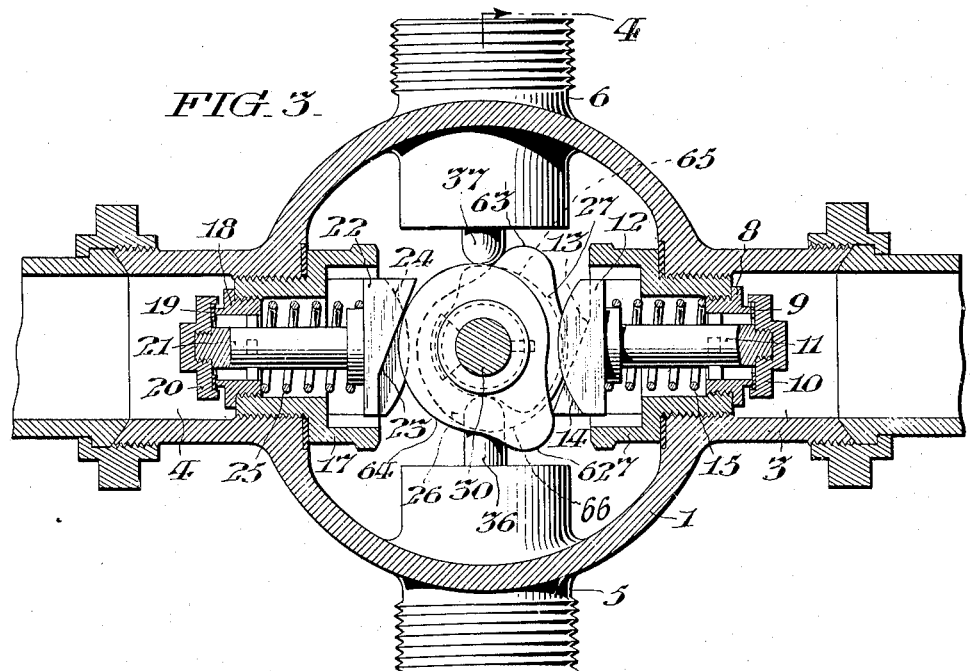
Fig. 3 is a transverse vertical sectional view of the valve structure shown in Figs. 1 and 2, taken on the line 3—3 in Fig. 2.
Figure 4:
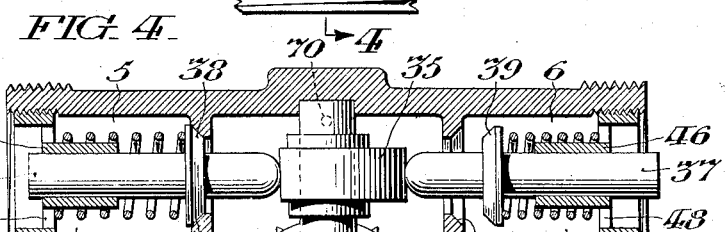
Figure 5:
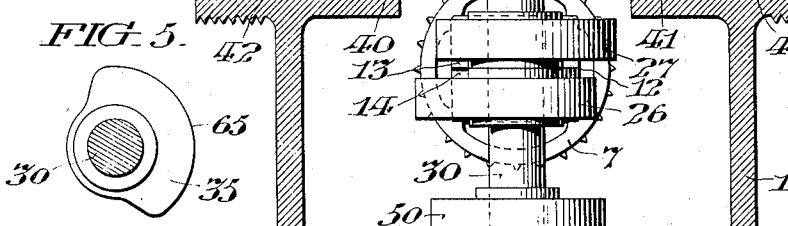
Figure 6:
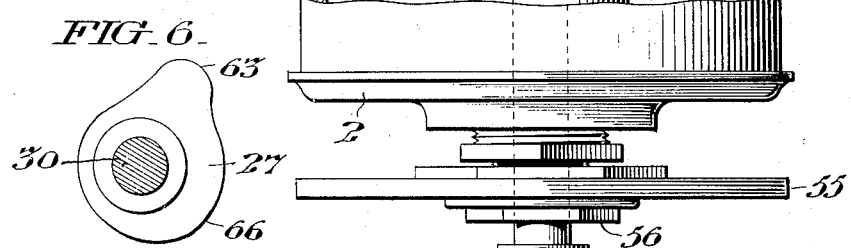
Figure 7:
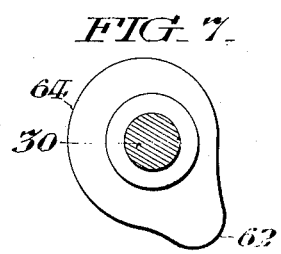

Fig. 4 is a vertical longitudinal sectional view of said valve structure taken on the line 4—4 of Fig. 3, the forward portion being shown in elevation for convenience of illustration; and Figs. 5, 6 and 7 are front elevational views of the valve actuating cams as they appear on the valve stem in Fig. 2 in consecutive order from the inner end of the valve stem outwardly, the valve stem being shown in section for convenience of illustration.

In said figures the structure comprising the valve casing body 1 having the closure 2 is provided with the cold and hot water inlets 3 and 4, and the delivery outlets 5 and 6 respectively, which may lead to suitable bath or shower fixtures.

Within the cold water inlet 3 is fitted the valve unit comprising the caging or bushing 7 in threaded engagement with the inner wall of said inlet, and provided with the valve seat ring 8 having the valve seat 9 removably engaged in threaded relation with said caging or bushing 7. Cooperatively engaged with said valve seat 9 is the valve 10 which is carried by the valve plunger 11 terminating at its inner end in the cam block 12 comprising the cam engaging surfaces 13 and 14, as best shown in Fig. 3. Said valve 10 is in threaded engagement with the plunger 11 and is arranged to be normally engaged with its seat 9 by the spring 15 embracing the plunger 11 and interposed between the cam block 12 and the valve seat ring 8.

A similar valve unit is disposed within the hot water inlet 4 and comprises the caging or bushing 17, valve seat ring 18 having the valve seat 19, valve 20, plunger 21, cam block 22, having cam engaging surfaces 23 and 24, and the spring 25 tending to maintain the valve 20 engaged with its seat 19.

The valves 10 and 20 are arranged to be actuated by cooperation of the cam engaging surfaces 13, 14, 23 and 24 with the cams 26 and 27 which are mounted on the valve stem 30 and arranged to be rotated therewith to effect the actuation of the valves 10 and 20 in a predetermined sequence to admit cold and hot water into the chamber in the valve casing body as desired.

Said valve stem 30 also carries the valve actuating cam 35 which cooperates with the valve plungers 36 and 37 carrying the valves 38 and 39 respectively arranged to engage the valve seats 40 and 41 of the outlets 42 and 43 respectively arranged to be connected to different fixtures, such as a bath tub or a shower, to which cold or warm water is to be delivered or supplied.

The valve plungers 36 and 37 are maintained in alinement by the bearing bushings 45 and 46 respectively threaded in the outlets 5 and 6 and having the openings 47 and 48 for the free flow of water therethrough.

The valve stem 30 extends forwardly through the stuffing-box 50 and packing 51 therein, and projects outwardly beyond the cover or closure 2 of the valve casing body 1, and is provided with the controlling lever or handle 52, which is extended to provide the pointer 53 directed toward the dial plate 55.

Said dial plate 55 is clamped between the flange 56 of the bushing 57 and collar 58, and may be adjusted axially on the valve stem 30 by the threaded engagement of said bushing 57 with the packing follower 60 of the stuffing-box 50, and by means of such adjustment said dial plate may be conveniently advanced or retracted into flush relation with the tile or wall surface in which the valve casing body may be imbedded.

As shown in Fig. 1, the dial plate indicates the shower in the upper half and the tub in the lower half, and also indicates the positions of the handle and its pointer to deliver cold or warm water to either the shower or bath when moved from its closed or normal position, as indicated in said figure.

It may be noted here that in the relative position of the cams 26, 27 and 35 the latter maintains the valve open which controls the outlet leading to the shower fixture, and that an anti-clockwise movement of the valve handle 52 effects such a rotation of the valve stem 30 and the cams 26, 27 and 35 that the hump 62 of the cam 26 engages the convex cam surface 14 of the cam block 12 and forces the valve 10 off its seat 9, to permit the admission of cold water into the valve chamber, and should the handle be stopped in this position, a flow of said cold water will be delivered to the shower fixture, but if, however, the handle is further rotated in said anti-clockwise direction for an additional quarter turn or three-eighths of a turn from its closed position, the hump 63 of the cam 27 will engage the convex surface 24 of the cam block 22 and thereby force the valve 20 off its seat 19, to admit hot water into the valve chamber with the cold water which continues to flow by reason of the engagement of the cam engaging surface 14 with the face of the circular cam sector 64 which is of reduced diameter and merges into the hump 62.

If, however, it is desired to deliver water to the bath outlet 5 the valve handle 52 is turned in a clockwise direction which, as will be best seen in Fig. 3, will withdraw the enlarged sector 65 of the cam 35 from the valve plunger 37 to permit the closing of the valve 39, and will contemporaneously effect the opening of the valve 38 by causing its valve plunger 36 to ride up onto the said enlarged sector of said cam 35. Having thus closed the outlet 6 to the shower, and opened the outlet 5 to the bath, a further rotation of the valve stem 30 causes the hump 63 of the cam 27 to engage the cam block 12 and by sliding upon its inclined cam engaging surface 13 force said cam block 12 backward toward the right hand in Figs. 2 and 3, to effect the opening of the valve 10 from its seat 9 and thereby admit cold water into the valve chamber. The continued rotation of the valve stem 30 causes the circular cam portion 66 of the cam 27 to engage the convex cam 24 of the cam block 22 to effect opening of the valve 20 to permit the admission of hot water in gradually increasing quantities into the mixing chamber of the valve casing 1. By still continuing the rotation of the valve stem 30 the hump 62 of the cam 26 contacts with the flat cam surface 23 of the cam block 22 to effect wider opening of the valve 20 to permit an increased supply of hot water into the mixing chamber. As the hump 63 rides off of the flat cam surface 13 of the cam block 12 a portion of the circular cam surface 64 of the cam 26 contacts with the convex surface 14 of the cam block 12 to continue to hold the valve 10 open to permit a decreased flow of cold water into the mixing chamber.

As shown in Figs. 2, 3 and 4 the rotation of the valve stem 30 is limited by the pin 70 which, as best shown in Figs. 2 and 3, is arranged to engage the stop lug 71, projecting inwardly from the rear wall of the valve casing body 1, the warm water positions of the handle 52, as indicated on the dial plate 55, being the respective limits of rotation.

By an inspection of Figs. 2 and 3 it will be observed that the cam blocks 12 and 22 are so arranged that the convex cam surface 14 is opposed to the inclined plane cam surface 23, and that the convex cam surface 24 is opposed to the inclined plane cam surface 13. It will also be observed that while the hump 62 of the cam 26 cooperates with both the convex cam engaging surface 14 and with the inclined plane cam engaging surface 23, and the hump 63 of the cam 27 with the convex cam engaging surface 24 and with the inclined plane cam engaging surface 13, the circular cam sectors 64 and 66 of the respective cams 26 and 27 freely clear the inclined cam engaging surfaces 13 and 23. But the said circular cam sectors 64 and 66 are of sufficient radial extent or height to engage the convex cam engaging surfaces 14 and 24 and to maintain the corresponding valves open while thus engaged.

My invention is advantageous, in that the valve may be actuated by a single controlling lever or handle to control the flow of either cold water or a mixture of hot and cold water in a predetermined sequence, and to selectively deliver the same to different fixtures for use.

Furthermore, by the construction and arrangement contemplated it is not possible to deliver hot water without the admixture of cold water during the cycle of actuation, whereby accidents due to scalding may be avoided.

It is obvious that the sequence of actuation of the cams 26, 27 and 35 may be varied by relatively adjusting them on the valve stem, and, therefore, I do not desire to limit my invention to the precise details of construction and arrangement as herein set forth, as it is obvious that various modifications may be made therein without departing from the essential features of my invention as defined in the appended claims.

Having thus described my invention, what I claim and desire to secure by Letters Patent is:

1. A valve of the class described, comprising inlets respectively leading from different sources of supply, a plurality of outlets, inlet controlling units each having cam engaging surfaces of relatively different formation, a valve stem, and cams on said valve stem adjusted to engage said cam engaging surfaces in a predetermined sequence.

2. A valve of the class described, comprising inlets respectively leading from different sources of supply, a plurality of outlets, inlet controlling units each having cam engaging surfaces of relatively different formation, a valve stem, cams on said valve stem adjusted to engage said cam engaging surfaces in a predetermined sequence, outlet controlling units, and a cam on said valve stem arranged to actuate said units to open one or the other of said outlets in a predetermined relation to the actuation of said inlets.

3. A valve of the class described, comprising inlets respectively leading from different sources of supply, inlet controlling units each having cam engaging surfaces of relatively different formation, the cams of said respective units being counterpart, and the units being disposed so that the cam engaging surfaces of different formation of the respective units are opposed in reversed order, a rotatable valve stem, and cams on said valve stem adjusted to engage said cam engaging surfaces in a predetermined sequence.

4. A valve of the class described, comprising inlets respectively leading from different sources of supply, inlet controlling units each having cam engaging surfaces of relatively different formation, the cams of said respective units being counterpart, and the units being disposed so that the cam engaging surfaces of different formation of the respective units are opposed in reversed order, a rotatable valve stem, cams on said valve stem adjusted to engage said cam engaging surfaces in a predetermined sequence, an actuating handle on said valve stem, and a dial having indicating indicia thereon with which said handle is arranged to cooperate, and means arranged to effect adjustment of said dial toward and from the body of said valve.

5. A valve of the class described, comprising inlets respectively leading from different sources of supply, inlet controlling units each having a convex cam-engaging surface, and an inclined plane cam engaging surface, the respective units being disposed so that the convex cam engaging surface of the one is opposed to the inclined plane cam engaging surface of the other, a rotatable valve stem, and cams disposed between said opposed cam engaging surfaces so relatively disposed as to cooperate with said cam engaging surfaces in a predetermined sequence.

6. A valve of the class described, comprising a valve chamber having inlets respectively leading from different sources of supply, inlet controlling units removable and replaceable through said chamber, and each being similarly provided with cam engaging surfaces of relatively different formation, said units being disposed with their respective cam engaging surfaces relatively opposed in reversed relation, a valve stem, and cams on said valve stem disposed between said opposed cam engaging surfaces and arranged to effect their actuation to open and close said inlets in a predetermined sequence.

7. A valve structure of the class described comprising inlets respectively leading from different sources of supply and a plurality of outlets leading to different distributing points, inlet and outlet controlling units comprising valves mounted upon valve plungers located in said inlets and outlets, the inner ends of said plungers terminating in cam engaging surfaces, cams located intermediate the inner ends of said plungers and adapted to contact directly therewith to effect actuation of the said plungers and the valves mounted thereon, and means for actuating the said cams.

8. A valve structure of the class described comprising inlets respectively leading from different sources of supply and a plurality of outlets leading to different distributing points, inlet and outlet controlling units comprising valves mounted upon valve plungers located in said inlets and outlets, the inner ends of the said plungers being provided with cam engaging surfaces, cams located intermediate the inner ends of the said plungers and adapted to contact directly with the said surfaces, the said cams respectively having surfaces shaped so as to effect actuation of the said valves in a predetermined sequence and means for actuating the said cams to effect opening or closing of the said valves.

9. A valve of the class described comprising a casing inclosing a mixing chamber and being provided with hot and cold water inlet openings located in spaced relation to each other and with outlet openings also located in spaced relation to each other, valve seats located in said inlet and outlet openings, valves adapted to contact with said seats mounted upon plungers, said plungers extending into said mixing chamber and terminating in cam engaging surfaces, a valve stem, cams mounted upon said valve stem, the surfaces of said cams contacting with the cam engaging surfaces of said valve plungers, and means to revolve said valve stem and cams to effect the opening of the said valves in a predetermined sequence.

In testimony that I claim the foregoing as my invention, I have hereunto signed my name this 10th day of July, A. D., 1925.

JOHN W. LAWLESS.